(No Model.)
A. LA POINT.
POWDER AND SHOT CABINET.
No. 382,817. Patented May 15, 1888.
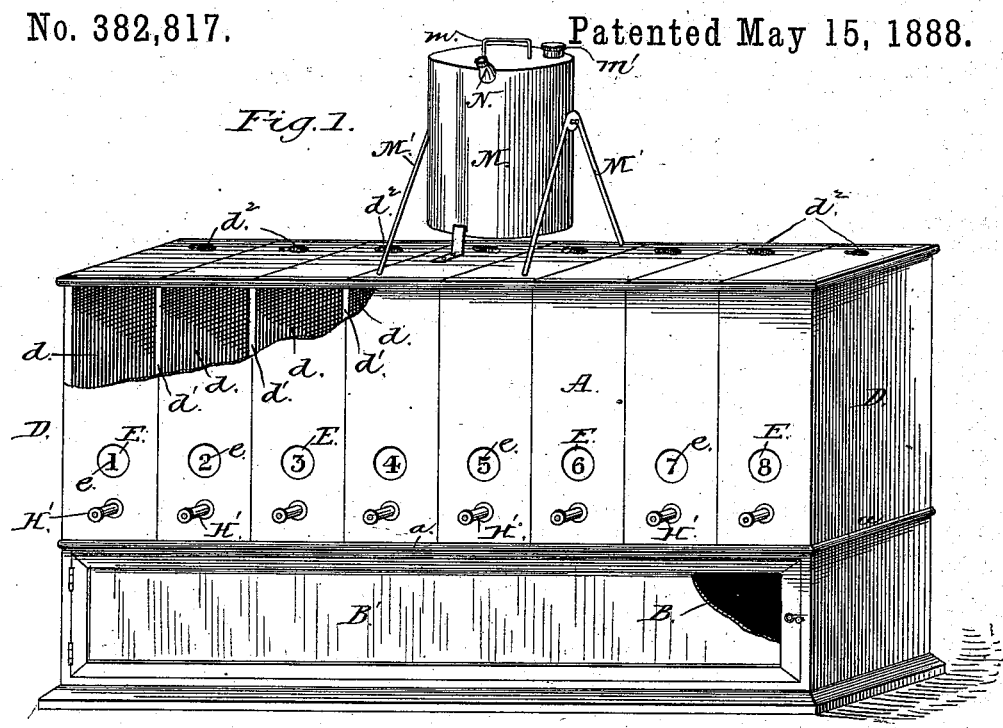
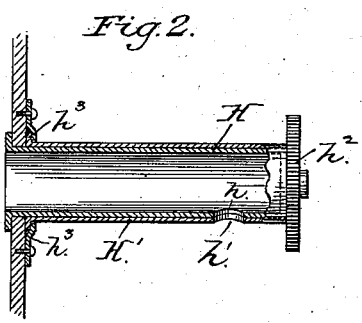
WITNESSES:
John A. Ellis
C. Sedgwick
INVENTOR:
A. La Point
BY
Munn
ATTORNEYS.

UNITED STATES PATENT OFFICE.

AUGUSTINE LA POINT, OF WESSINGTON SPRINGS, DAKOTA TERRITORY.

POWDER AND SHOT CABINET.

SPECIFICATION forming part of Letters Patent No. 382,817, dated May 15, 1888.

Application filed September 13, 1887. Serial No. 249,569. (No model.)

*To all whom it may concern:*

Be it known that I, AUGUSTINE LA POINT, of Wessington Springs, in the county of Jerauld and Territory of Dakota, have invented a new and Improved Powder and Shot Cabinet, of which the following is a full, clear, and exact description.

My invention relates to an improved cabinet for powder and shot, and has for its object to provide a convenient means of handling powder and shot, and wherein a merchant will have handily and separately arranged the various sizes of shot, the powder separate from the shot, and cartridges and caps in a compartment separated from both.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in both the figures.

Figure 1 is a perspective view, partly broken away; and Fig. 2 is a central vertical section through a faucet.

In carrying out the invention a rectangular case, A, is provided, divided into two compartments by a horizontal and longitudinal partition, $a$, of which the lower and smaller compartment, B, is provided with a glass door, B', hinged and bolted in any suitable manner. The compartment B is adapted to receive cartridges and gun-caps, the glass door rendering them visible and admitting of display.

The upper compartment, D, is subdivided into eight or more lockers, $d$, by a series of vertical partitions, $d'$, into each of which lockers one size of shot is poured through a properly-capped opening, $d^2$, at the top. Thus each locker will contain a different size, which is indicated by panes of glass E, either circular or of any desired shape, provided in the front of each locker, and in addition to the glass, whereby the size may be observed, the number of the size is produced plainly upon the panes, as indicated at $e$.

As a means of withdrawing the shot from the lockers, near the bottom of each locker a tube, H, is inserted, projecting a distance horizontally outward from the locker, having the outer end sealed and an aperture, $h$, cut in the under side near said sealed end, as shown in Fig. 2. A cylindrical casing, H', is slid over the tube H, being made of sufficient diameter to readily turn upon the tube, and provided near the outer end with an aperture, $h'$, corresponding to the aperture $h$ in the tube, whereby, when the casing is revolved upon the tube until the aperture $h'$ is at the under side, the apertures $h$ and $h'$ will register and permit the shot to escape. The cylindrical casing is revolved by means of a disk, $h^2$, having a milled periphery, which disk constitutes the cap of the casing.

The inner end of the casing is provided with an outer peripheral flange, and over the casing a collar, $h^3$, is slid to an engagement with said flange, the collar being attached to the face of the lockers, as shown in Fig. 2. By this means the casing is held in position. If desired, a pin may be attached to the tube projecting out through a diametrical slot in the casing, and the revolution of the latter be thereby limited.

Centrally the top of the case or cabinet a powder-can, M, is pivoted between vertical brackets M', which can is provided upon the top with a handle, $m$, and an aperture, $m'$, for introducing the powder, having a screw-cap, and the can in the front near the top is also provided with a spout, N, adapted as an exit for the powder when the can is tilted. The said spout is closed with a rubber stopper when the can is in a perpendicular position.

A spring-stop is preferably attached to the top of the cabinet to engage the front of the powder-can when the latter is in its normal or vertical position, and the bottom of the shot-compartments is preferably inclined from the rear downward to the front in order to facilitate the flow of the shot.

Having thus fully described my invention, I claim as new and desire to secure by Letters Patent—

1. A cabinet comprising the receptacle A, divided into compartments B and D by a horizontal partition, $a$, a series of vertical partitions, $d'$, subdividing the compartment D into lockers $d$, adapted to contain shot, each locker provided with an inlet and a glass plate indicating the size, and a glass door, B', covering the compartment B, and means, substantially as shown and described, for withdrawing the shot from the several lockers.

2. The combination, with the receptacle A, divided into compartments B and D by a horizontal partition, $a$, and a series of vertical partitions, $d'$, subdividing the compartment D into lockers $d$, adapted to contain shot, each locker provided with an inlet, of a revoluble faucet attached to each locker, consisting of an apertured tube, H, a similarly-apertured revoluble casing, H', provided with a milled disk, $h^2$, and collar $h^3$, all combined to operate substantially as herein set forth.

3. The combination, with the receptacle having an opening in one wall, of the tube H, registering with said opening and provided with an aperture, $h$, the tube H' upon the tube H, and provided at its outer end with a head, $h^2$, an aperture, $h'$, to register with aperture $h$, and a flange or projection at its inner end, and the loose collar $h^3$ upon the tube H, and secured to the outer wall of the receptacle to allow the rotation of the tube H', but prevent longitudinal movement, substantially as set forth.

AUGUSTINE LA POINT.

Witnesses:
CHAS. W. MCDONALD,
J. N. SPEARE,
J. D. MORSE.